United States Patent Office 3,409,678
Patented Nov. 5, 1968

3,409,678
ALKYLATION OF PHENOLS
Hans L. Schlichting, Grand Island, and Anthony D. Barbopoulos and Walter H. Prahl, Buffalo, N.Y., assignors to Hooker Chemical Corporation, Niagara Falls, N.Y., a corporation of New York
No Drawing. Filed Nov. 19, 1965, Ser. No. 508,822
3 Claims. (Cl. 260—621)

ABSTRACT OF THE DISCLOSURE

Alkylated phenolic compounds are produced by passing in the vapor phase a mixture of an alkyl aryl ether, aryl having at least one reactive position, and a small but effective amount of a hydrogen halide over an alumina catalyst, and separating the alkylation product from the reaction mixture. The process is highly selective to the ortho-position.

---

This invention relates to a process for preparing alkylated phenols. More particularly, the invention relates to a catalytic vapor-phase process for preparing alkylated phenols.

It is known that alkyl aryl ethers such as methyl phenyl ether may be transformed in the vapor phase, at elevated temperatures, in the presence of alumina as a catalyst, to alkyl phenols such as cresol. As previously carried out thhe transformations have been subject to considerable by-product formation, low yields and, additionally, to the formation of numerous polyalkylated phenols as well as non-selective substitution.

Selectively substituted phenols are commercially desirable for various applications. For instance, ortho-cresol is used as an intermediary in the production of plastics, antioxidants, and other useful compounds; meta- and para-cresol are useful intermediates for preparing dyes, pharmaceuticals, antioxidants, and so forth; and 2,6-xylenol is used as a starting material for polyphenylene oxide plastics and bisxylenol plastics.

It is an object of the present invention to provide an improved process for preparing alkylated phenols. Another object of this invention is to provide a process whereby improved selective positioning of the alkyl substituent in the phenolic molecule is achieved. Other objects of the invention will be apparent from the following detailed description.

In accordance with the practice of the invention, it has now been found that excellent yields of selectively alkylated phenols can be obtained when an alumina catalyst-containing reaction zone is established to which an alkyl aryl ether is continuously fed, under reaction conditions, and fed simultaneously therewith is a small but effective amount of a hydrogen halide. The alkylation product, e.g., the selectively alkylated phenol, is thereafter recovered from the reaction mixture.

From a further description of the invention, it will be readily apparent that the novel process offers numerous advantages. The presence of a minor proportion of a hydrogen halide, under reaction conditions, provides (1) reactivity at lower temperature, thus reducing undesirable decomposition, improving the yield, and contributing to the longer usefulness of the catalyst; and (2) an improved selectivity of reaction to ortho-alkylated products of phenols.

As the alkyl aryl ether reactant there may be utilized compounds wherein aryl, having at least one reactive position, preferably ortho, is of 6 to 16 carbon atoms, preferably of 6 to 12 carbon atoms, alkyl is of 1 to 10 carbon atoms, preferably of 1 to 6 carbon atoms, and the combined carbon content of the molecule does not exceed 18. Such compounds, for example, may be anisole, phenetole, isopropyl phenyl ether, butyl phenyl ether, pentyl phenyl ether, hexyl phenyl ether, cyclohexyl phenyl ether, octyl phenyl ether, nonyl phenyl ether, methylanisoles, ethylanisoles, methylphenetoles, ethylphenetoles, methyl cresyl ethers, hexyl ethylphenyl ethers, octyl propylphenyl ethers, nonyl butylphenyl ethers, and the like.

The alumina catalysts especially useful in the practice of the invention comprise the aluminum oxides having extensive surface areas and great adsorptive capacities. Such alumina may be obtained from natural sources or may be prepared synthetically, as described, for instance, in "Catalysis," vol. I, P. H. Emmett, 327 (1954).

The hydrogen halide employed is most conveniently anhydrous hydrogen chloride gas, but aqueous hydrochloric acid of any concentration to satisfy the required hydrogen chloride concentration in the reaction zone may also be used. However, anhydrous or aqueous hydrogen bromide may also be utilized.

The hydrogen halide employed as the catalyst activator may be introduced to the reaction in molar proportions based on a molar proportion of alkyl aryl ether and may range from 0.005:1 to 1:1, preferably 0.01:1 to 0.05:1.

Residence time in the reaction zone may be greater than about one minute, but preferably the residence time is maintained between 5 seconds and 20 seconds. Suitable operating temperatures for the reaction may range from 150 degrees centigrade to 350 degrees centigrade, although it is preferred to maintain the temperature in the range of 250 degrees centigrade to 325 degrees centigrade. While the foregoing temperatures represent the preferred temperatures, generally they may vary depending upon the vaporization temperatures of the reactants. Although the pressure of the reaction is maintained at atmospheric pressure, it is within the scope of this invention to employ subatmospheric and superatmospheric pressures, depending upon the design of the reactor.

The process of the invention may be carried out in any suitable catalytic reaction chamber packed with grains or pellets of alumina catalyst, as such or in combination with carriers, equipped with heating and/or preheating systems, and having a separating and recovery system, such as distillation columns or extraction columns, whereby recovery of the reaction products and recycling of the unreacted reactants and/or intermediaries may be accomplished.

Advantageously, a vertical column packed with alumina catalyst and adapted to receive the feed stream, for instance, at the top and discharge the effluent at the bottom may be effectively employed. In some instances, it is possible to employ a fluidized bed reactor, wherein the catalyst is in a fluidized form. Additionally, it is within the scope of the invention to utilize other known and convenient methods.

The effluent of the reaction zone is processed so as to separate the alkylation product. Suitable methods for the separation of said reaction product from the reaction mixture include distillation, fractionation or extraction.

It is also within the scope of this invention to prepare o,o-alkylated phenols by passing an aryl alkyl ether, wherein alkyl represents one of the desired ortho-alkyl substituents, with an alkylating agent, such as an alkyl alcohol, alkyl halide, alkyl ether or alkene compound, according to the process of the invention. Thus, 2,6-xylenol may be prepared by passing anisole, methanol and hydrogen chloride over the reaction zone of alumina catalyst.

The following examples are presented to further illustrate the novelty and utility of the present invention but not with the intention of unduly limiting the same. Unless otherwise indicated, all temperatures are in degrees centigrade and all parts and percentages are by weight.

EXAMPLES 1-3

The advantageous effects of the presence of small amounts of hydrogen chloride on the rearrangement of anisole in the presence of alumina catalyst to form o-cresol are demonstrated by the following three examples conducted under the hereinafter mentioned and listed conditions. One reaction mixture contained hydrogen chloride in accordance with the present invention. The other two were run for comparison purposes.

Three reactors were each packed with 400 parts of activated alumina granules and placed in electrically heated and controlled salt baths.

In Example 1 a mixture containing a 1.0 molar proportion of anisole and an .019 molar proportion of hydrogen chloride was continuously fed to the reactor. In Examples 2 and 3 only anisole was continuously fed to the reactors. The effluent stream of all three reactors was collected as condensate and analyzed by gas chromatography. The following table gives the reactants, amounts, and reaction conditions employed as well as giving the results obtained:

EXAMPLE 1

Feed:
  Anisole ------------------------------parts-- 1080
  HCl gas ------------------------------do--   7
Temperature ----------------------------° C-- 300
Condensate:
  Anisole ------------------------------parts-- 8
  Phenol -------------------------------do----  230
  o-Cresol -----------------------------do----  420
  m-Cresol -----------------------------de----  1
  p-Cresol -----------------------------do----  1
  Xylenols -----------------------------do----  255
  High boilers -------------------------do----  50
Conversion of PhOMe --------------------percent-- 99

EXAMPLE 2

Feed:
  Anisole ------------------------------parts-- 1080
  HCl gas ------------------------------
Temperature ----------------------------° C-- 320
Condensate:
  Anisole ------------------------------parts-- 10
  Phenol -------------------------------do----  227
  o-Cresol -----------------------------do----  273
  m-Cresol -----------------------------do----  81
  p-Cresol -----------------------------do----  100
  Xylenols -----------------------------do----  212
  High boilers -------------------------do----  100
Conversion of PhOMe --------------------percent-- 99

EXAMPLE 3

Feed:
  Anisole ------------------------------parts-- 1080
  HCl gas ------------------------------
Temperature ----------------------------° C-- 300

Condensate:
  Anisole ------------------------------parts-- 162
  Phenol -------------------------------do----  188
  o-Cresol -----------------------------do----  240
  m-Cresol -----------------------------do----  71
  p-Cresol -----------------------------do----  90
  Xylenols -----------------------------do----  185
  High boilers -------------------------do----  75
Conversion of PhOMe --------------------percent-- 85

The reaction temperature of Example 2 was adjusted to obtain the same 99 percent conversion as in Example 1. Advantageously, in accordance with the process of the invention (1) the same percent conversion of anisole was obtained at a lower temperature, that is, at 300 degrees centigrade in Example 1 as compared to Example 2 at 320 degrees centigrade; (2) a substantial selectivity to ortho-substitution over meta- and para-substitution is clearly shown by Example 1, wherein 99.2 percent of the mono-substituted products is o-cresol, as compared to 60.2 percent in Example 2 conducted in the absence of hydrogen chloride; and (3) yields of desirable products, such as o-cresol, m-cresol, p-cresol and xylenols, was increased as shown by the reduction of the yield of 14.0 percent high boilers in Example 2 to a yield of 6.8 percent of high boilers in Example 1 which was conducted in the presence of hydrogen chloride.

When anisole in Example 1 is replaced by a compound such as phenetole, butyl phenyl ether, pentyl phenyl ether, nonyl phenyl ether or the like, similar ortho-alkylation occurs, producing the corresponding ortho-alkylated phenol (2- or o-alkylated phenol).

It is also apparent that when anisole in Example 1 is replaced by a compound such as o-methylanisole, o-ethylanisole, o-methylphenetole, hexyl o-ethylphenyl ether, nonyl o-butylphenyl ether, or the like, similarly ortho-alkylation occurs, producing the corresponding ortho-alkylated phenol (2,6- or o,o-alkylated phenol).

From the foregoing description and examples, it is apparent that various modifications are possible within the scope of this invention and it is therefore not to be construed as limiting the invention except as defined by the appended claims.

What is claimed is:
1. The process for the production of alkylated phenolic compounds comprising passing in the vapor phase a mixture of an alkyl aryl ether selected from the group consisting of anisole and o-methylanisole, and a small but effective amount of a hydrogen halide selected from the group consisting of hydrogen chloride and hydrogen bromide in molar proportions based on the aryl alkyl ether ranging from 0.005 to 1:1, over an alumina catalyst at a temperature from about 150 degrees centigrade to about 350 degrees centigrade, and separating the alkylation product from the reaction mixture.
2. A process in accordance with claim 1 wherein the alkyl aryl ether is anisole.
3. A process in accordance with claim 1 wherein the alkyl aryl ether is o-methylanisole.

References Cited

UNITED STATES PATENTS 1,876,435   9/1932   Schollkopf et al. ____ 260—621
2,289,886   7/1942   Schmerling _____ 260—621

LEON ZITVER, *Primary Examiner.*

H. ROBERTS, *Assistant Examiner.*